(12) United States Patent
Barari et al.

(10) Patent No.: US 10,608,269 B2
(45) Date of Patent: Mar. 31, 2020

(54) TEMPERATURE MEASURING METHOD

(71) Applicant: Ceres Intellectual Property Company Limited, Horsham, West Sussex (GB)

(72) Inventors: Farzad Barari, Horsham (GB); Paul Barnard, Horsham (GB); Robert Morgan, Horsham (GB); Mark Selby, Horsham (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 193 days.

(21) Appl. No.: 15/242,143

(22) Filed: Aug. 19, 2016

(65) Prior Publication Data
US 2017/0069925 A1 Mar. 9, 2017

(30) Foreign Application Priority Data
Sep. 4, 2015 (GB) .................................. 1515740.7

(51) Int. Cl.
*H01M 8/04992* (2016.01)
*H01M 8/0432* (2016.01)
(Continued)

(52) U.S. Cl.
CPC ........ *H01M 8/04992* (2013.01); *G01K 1/026* (2013.01); *G01K 7/04* (2013.01);
(Continued)

(58) Field of Classification Search
CPC ......... H01M 8/04992; H01M 8/04328; H01M 8/04067; H01M 8/04708; H01M 8/04753;
(Continued)

(56) References Cited

U.S. PATENT DOCUMENTS 3,776,039 A 12/1973 Bowen
5,080,496 A 1/1992 Keim et al.
(Continued)

FOREIGN PATENT DOCUMENTS

AT 10959 U2 1/2010
CN 103983365 8/2014
(Continued)

OTHER PUBLICATIONS

A Design of Experiments (DOE) approach to optimise temperature measurement accuracy in Solid Oxide Fuel Cell (SOFC), F. Barari, R. Morgan and P. Barnard, Journal of Physics: Conference Serial, 547 012004 (2014.

*Primary Examiner* — Muhammad S Siddiquee
(74) *Attorney, Agent, or Firm* — SGPatents PLLC

(57) ABSTRACT

A fuel cell system comprising a controller, a temperature sensor that has a physical presence in a conduit within the system to measure the temperature of the fluid at a point within the conduit ($T_g$) and a wall temperature sensor for sensing a temperature of a wall of the conduit ($T_w$). The controller takes $T_g$ and $T_w$ as inputs and applies an equation with known constants to calculate measurement error of $T_g$ based on the local flow temperature and geometry and arrives at a calculated temperature. The equation may be applied iteratively until the difference between the calculated temperature and $T_g$ is below an acceptable value when the calculated temperature can then be assumed to be an accurate representation of the actual gas temperature at the $T_g$ measurement point. The direction of calculation is controlled by the relative difference between $T_g$ and $T_w$.

10 Claims, 5 Drawing Sheets

(51) Int. Cl.
  *H01M 8/04701* (2016.01)
  *H01M 8/04746* (2016.01)
  *G01K 13/02* (2006.01)
  *G01K 7/42* (2006.01)
  *H01M 8/04007* (2016.01)
  *G01K 1/02* (2006.01)
  *G01K 7/04* (2006.01)
  *H01M 8/124* (2016.01)

(52) U.S. Cl.
  CPC .............. *G01K 7/42* (2013.01); *G01K 13/02* (2013.01); *H01M 8/04067* (2013.01); *H01M 8/04328* (2013.01); *H01M 8/04335* (2013.01); *H01M 8/04708* (2013.01); *H01M 8/04753* (2013.01); *H01M 2008/1293* (2013.01)

(58) Field of Classification Search
  CPC ...... H01M 8/04335; H01M 2008/1293; G01K 1/026; G01K 7/04; G01K 13/02; G01K 7/42
  See application file for complete search history.

(56) References Cited

U.S. PATENT DOCUMENTS

| | | | | |
|---|---|---|---|---|
| 6,983,223 | B2* | 1/2006 | Schuh | G01K 7/026 |
| | | | | 374/E7.007 |
| 7,824,099 | B2 | 11/2010 | He et al. | |
| 2012/0064422 | A1* | 3/2012 | Takeuchi | H01M 8/04022 |
| | | | | 429/423 |
| 2013/0052892 | A1* | 2/2013 | Saruwatari | F01N 3/043 |
| | | | | 440/89 H |
| 2018/0110913 | A1* | 4/2018 | Loderer | A61M 1/3626 |
| 2018/0112828 | A1* | 4/2018 | Bourgeois | F17C 5/06 |

FOREIGN PATENT DOCUMENTS

| | | |
|---|---|---|
| EP | 1014061 | 6/2000 |
| EP | 2309239 | 4/2011 |
| EP | 2738372 | 6/2014 |
| WO | 2015004419 | 1/2015 |

* cited by examiner

TEMPERATURE MEASURING METHOD

FIELD OF THE INVENTION

Embodiments are generally concerned with measuring and, preferably, correcting the temperature of a fluid or a gas flowing in a conduit. More specifically, embodiments are concerned with measuring and, preferably, correcting the temperature of a gas flowing in a conduit of a fuel cell system.

BACKGROUND OF THE INVENTION

Solid oxide fuel cells are temperature dependent electrochemical devices. The operational temperature of the fuel cell affects the rate of the electrochemical reaction and electrical (ionic) resistance of the cells. To this end one of the main requirements of a fuel cell system is to control the temperature of the anode and cathode gas streams to the fuel cells to optimise the operating temperature of the fuel cells and hence the operating point of the fuel cells across the power output range. The result of good optimisation is higher fuel cell system efficiency. For this purpose it is desirable to measure the temperature of gases flowing at various measurement points within an apparatus comprising the fuel cell. Such temperature measurement may be in the fuel cell stack or the fluid conduits to and or from the fuel cells or the fuel cell stack. Such gas flow is, however, often turbulent and at varying flow speeds that may not be precisely known. Moreover, physical sensors that can be used in an economically feasible way for making such measurements either lack a desired measurement accuracy or have to be protected from the environmental conditions presented to them by the gas flow to avoid deterioration. Sheltering such sensors, however, can give rise to further inaccuracies in conducted measurements particularly where the measurements occur in confined conduits. The present invention seeks to address, overcome or mitigate at least one of these or other disadvantages.

SUMMARY OF THE INVENTION

According to an aspect of the present invention there is provided a fuel cell system comprising a controller, a temperature sensor that has a physical presence in a conduit within the system and a wall temperature sensor for sensing a temperature of a wall of the conduit. The controller is operative to iteratively apply a thermal model to calculate a predicted temperature value that is, based on temperature values measured using the temperature sensor in the conduit and the wall temperature sensor, expected to be measured. When in an iterative step the predicted temperature value does not fulfil an interrupt criterion the input temperature value used in the next iterative step is altered based on a difference between the temperatures measured by the sensors.

The thermal model may take some or all of the heating effects the sensor in the conduit is subjected to into account and/or model these effects. The thermal model may, for example, take one or more of conductive, convective and radiative heating effects on the sensor into account.

In a first iteration step the input temperature can be the temperature measured using the sensor in the conduit.

The controller can be arranged to reduce the input temperature value for use in the next iterative step when the temperature value measured using the temperature sensor in the conduit is larger than the temperature value measured by the wall sensor and/or increase the input temperature value for use in the next iterative step when the temperature value measured using the temperature sensor in the conduit is smaller than the temperature value measured by the wall sensor.

A first alteration of the input temperature value can be larger than a second alteration, the first alteration being undertaken in an earlier iterative step than the second alteration.

The interrupt criterion may be fulfilled when the predicted temperature value falls within a predetermined temperature range of or below the temperature value measured using the sensor in the conduit in cases where the temperature value measured using the temperature sensor in the conduit is larger than the temperature value measured by the wall sensor.

Alternatively or additionally the interrupt criterion may be fulfilled when the predicted temperature value falls within a predetermined temperature range of or above the temperature value measured using the sensor in the conduit in cases where the temperature value measured using the temperature sensor in the conduit is smaller than the temperature value measured by the wall sensor.

Alternatively or additionally the interrupt criterion may be fulfilled when a predetermined number of iterative steps has been performed and/or when a predetermined time permitted for the calculation has elapsed.

A temperature value input in a final iterative step performed may be output as a corrected temperature of a gas flowing in the conduit.

The corrected temperature may be used to alter/control an operating parameter of the fuel cell system.

The operating parameter controlled may be the temperature and/or the mass flow rate of the gas inlet to and/or outlet of an anode and/or cathode of a fuel cell. It will be appreciated that such control can either be direct control of the parameter or indirect control that is achieved by influencing another parameter that alters the operating conditions of the fuel cell system.

Whilst a single controller may be used for altering the operating parameter as well as for applying the mathematical model in the above described iterative fashion the use of a single controller is by no means necessary. Instead two or more controller can be used for applying the mathematical model and for altering the operating parameter.

One or both temperature sensors can be thermocouples.

It was realised that the present invention, whilst useful in the context of fuel cell systems, may provide similar or the same benefits in measuring the temperature of any enclosed space within systems other than fuel cell systems. According to another aspect of the present invention there is therefore provided an apparatus comprising a controller, a temperature sensor that has a physical presence in a space within the system, the space partially or fully enclosed by a wall, and a wall temperature sensor for sensing a temperature of the wall. The controller is operative to iteratively apply a thermal model to calculate a predicted temperature value that is, based on temperature values measured using the temperature sensor in the space and the wall temperature sensor, expected to be measured. When in an iterative step the predicted temperature value does not fulfil an interrupt criterion the input temperature value used in the next iterative step is altered based on a difference between the temperatures measured by the sensors. Such other systems could include chemical reactor systems, fuel reforming systems and emission control systems.

It will be appreciated that, whilst embodiments are particularly useful in the context of measuring temperature in a conduit, they are more generally applicable to measuring temperature in enclosed spaces, irrespective of which system or apparatus they are used in.

Unless indicated otherwise, all temperature values are given in degrees Celsius (DegC).

A list of the reference signs used herein is given at the end of the specific embodiments.

Figure 1:
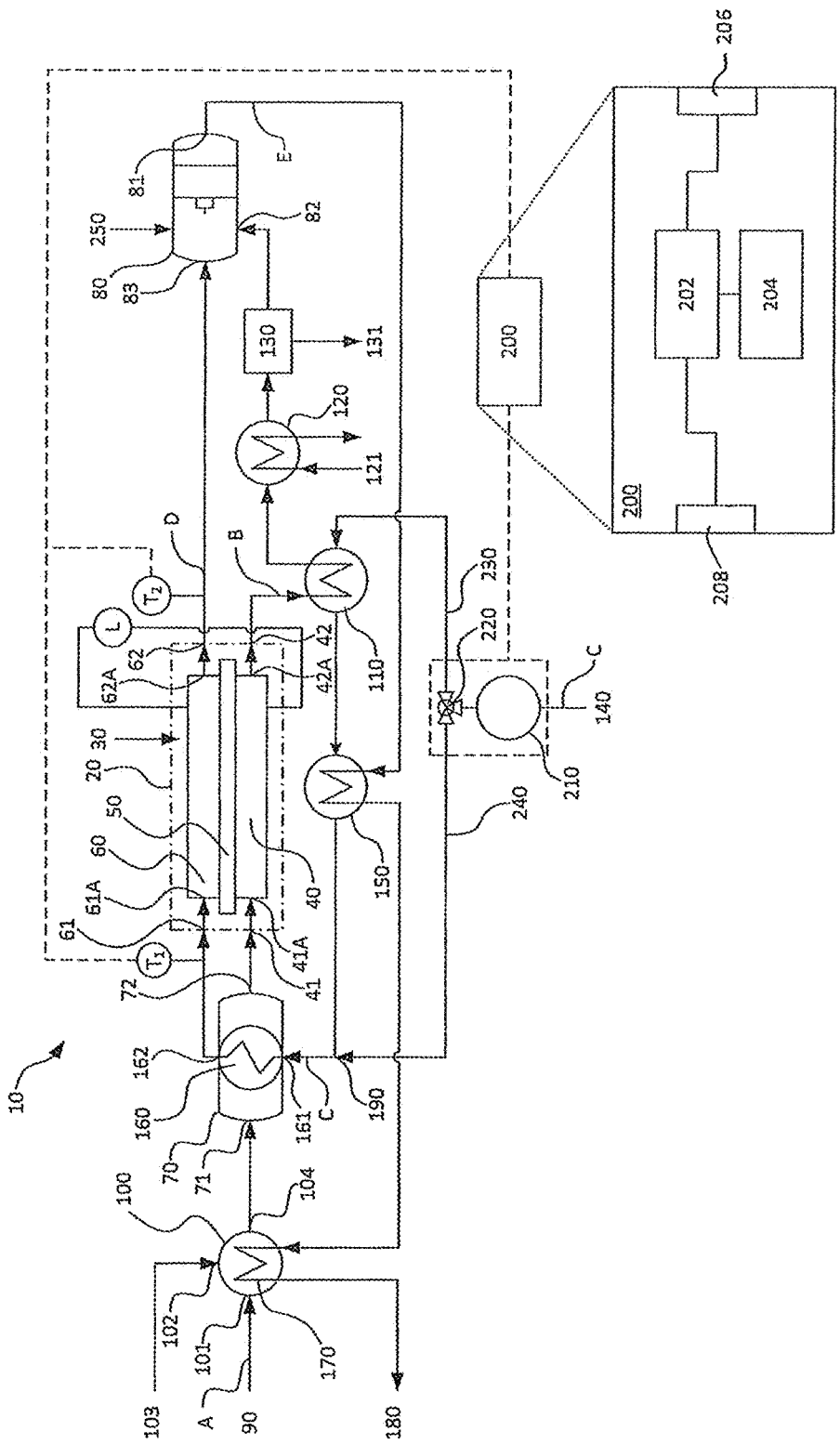
FIG. 1 shows a schematic of a fuel cell system.

FIG. 1 illustrates an example of an intermediate-temperature solid oxide fuel cell (IT-SOFC) system 10 as disclosed in published patent application WO 2015/004419. The description of this system provided in the present context is limited to those components pertinent to the present embodiments. Fuel cell stack 20 is a metal-supported IT-SOFC fuel cell stack, as disclosed in U.S. Pat. No. 6,794,075. The fuel cell stack 20 comprises a number of metal-supported IT-SOFC fuel cells 30. Each fuel cell 30 has an anode side 40, electrolyte layer 50, and cathode side 60. A steam reformer 70 is provided upstream of the fuel cell stack 20 and a tail-gas burner 80 is provided downstream of the anode and cathode outlets of the fuel cell stack 20.

A number of heat exchangers 110, 120, 150 and 170 and an evaporator 100 are also provided. Heat exchanger 110 is heated by the anode outlet gas flow and heats the main cathode inlet gas flow 230. The outlet of the tail-gas burner 80 is connected to the heat exchanger for the same purpose.

Valve/separator 220 is controlled by control means 200 so as to split the flow of inlet air between main cathode inlet gas flow path 230 and air bypass inlet gas flow path 240. Thus, the air bypass inlet gas flow path 240 bypasses anode off-gas heat exchanger 110 and air pre-heater heat exchanger 150.

Control means 200 is connected to fuel cell stack cathode inlet gas temperature sensor T1, fuel cell stack cathode off-gas temperature sensor T2, blower 210 and valve/separator 220. Control means 200 is configured to maintain the temperature determined by temperature sensors T1 and T2 at or about a desired temperature during steady-state operation of the fuel cell system. For a given fuel cell stack power point the control means is configured to monitor and control the operating temperature of the fuel cells in the fuel cell stack. This can be achieved by measuring the fluid temperatures of the fluids to and from the fuel cell stack.

Fuel cells operate within a defined temperature range for optimum efficiency. Intermediate Temperature Solid Oxide Fuel Cells (IT-SOFC), such as metal supported fuel cells, can operate between 450° C. and 650° C., with the optimum temperature range for a co-flow fuel cell stack design operating on reformed natural gas being between 540° C. (for the anode gas inlet) and 610° C. (for the anode gas outlet). For a co-flow metal supported fuel cell stack design this equates to 540° C. for the cathode gas inlet end of the fuel cell stack and 610° C. to the cathode gas outlet end of the fuel cell stack.

The temperature of operation of the electrochemistry of the fuel cell affects the operating efficiency of the electrochemical reaction and hence the operating efficiency of the fuel cell stack and the fuel cell system. Fuel cell systems and balance of plant components are designed to provide the fuel cell stack with the correct fluid flow conditions on both the anode and cathode sides of the fuel cell. Fluid flow conditions are described by flow rate, composition and temperature for both the fuel and air side. Having the ability to control each of these features of fluid flow is critical for optimising fuel cell stack efficiency. This in turn affects system efficiency.

In the system illustrated in FIG. 1 the cathode air stream (oxidant) is utilised for providing oxygen for the electrochemical reaction within the fuel cells and to provide cooling of the fuel cells within the stack. Thus the ability to control the rate of cathode air side cooling is important for fuel cell stack operation control and hence the operating efficiency of the fuel cell system. The temperature control at the fuel cell stack inlet and outlet is conveniently achieved by a combination of:

i. Controlling heating of the cathode inlet gas; and
ii. Controlling the mass flow rate of the cathode inlet gas Control means 200 is consequently adapted to operate two independent control loops which operate upon the cathode inlet gas passing through the cathode inlet gas fluid flow path C.

In the first control loop, the heating of cathode inlet gas is controlled. In the second control loop, the mass flow rate of cathode inlet gas is controlled.

For the first control loop, control means 200 controls valve/separator 220 so as to vary the split of inlet oxidant flow between fluid flow paths 230 and 240. Thus, control means 200 is configured so that if the temperature determined by fuel cell stack cathode inlet gas temperature sensor T1 is below 542 DegC for a fuel cell stack electrical power output of 1 kW, it adjusts valve/separator 220 to increase the proportion of inlet oxidant passing along main cathode inlet gas fluid flow path 230 to anode off-gas heat exchanger 110 and air pre-heater heat exchanger 150. Thus, the proportion of inlet oxidant passing along air bypass inlet gas flow path 240 is correspondingly reduced, and the heating of inlet oxidant is increased.

Conversely, if the temperature determined by fuel cell stack cathode inlet gas temperature sensor T1 is above 542 DegC for a fuel cell stack electrical power output of 1 kW, control means 200 adjusts valve/separator 220 to decrease the proportion of inlet oxidant passing along main cathode inlet gas fluid flow path 230 to anode off-gas heat exchanger 110 and air pre-heater heat exchanger 150. Thus, the proportion of inlet oxidant passing along air bypass inlet gas flow path 240 is correspondingly increased, and the heating of inlet oxidant is decreased.

Thus, the temperature of cathode inlet gas to the at least one fuel cell stack (as determined by fuel cell stack cathode inlet gas temperature sensor T1) is controlled.

Thus, the temperature of oxidant exiting reformer heat exchanger 160 at reformer heat exchanger oxidant outlet 162 is also controlled. Since reformer heat exchanger 160 is a parallel-flow heat exchanger, this means that the temperature of reformate (anode inlet gas) exiting steam reformer 70 at reformer outlet 72 is also controlled. This temperature is maintained irrespective of variations in (and therefore heat demands exerted by) mass flow of inlet oxidant and fuel, and variations in inlet temperatures of oxidant and fuel to the IT-SOFC system.

Thus, the temperature of anode inlet gas (i.e. quality of reformate) to the at least one fuel cell stack is controlled.

The second control loop is for the control of the at least one fuel cell stack cathode off-gas temperature. Since the cathode inlet gas temperature to the at least one fuel cell stack is controlled separately, the cathode off-gas temperature is controlled by varying the oxidant mass flow rate through the at least one fuel cell stack.

Thus, the control means is adapted to increase the cathode inlet gas mass flow rate if the temperature of cathode off-gas determined by the fuel cell stack cathode off-gas temperature sensor is above a predetermined temperature, and vice versa.

Whilst the above focussed on using the cathode gas temperatures to measure and control the operation of the fuel cell stack, it should be apparent that the same could be achieved my measuring the anode gas temperatures.

It will be appreciated that the effectiveness of the control mechanism described above critically depends on the accuracy of the temperature measured by the temperature sensors used. Thermometry system accuracy in particular plays an important role in achieving higher efficiency, better thermal management, longer product life and lower environmental impact.

There is thus a need to have a repeatable temperature measurement that maintains repeatability over time. Such a time may be the lifetime of the system, which may range from days to years. Typical applications may have lifetimes in the region of 5 to 10 years.

Details of the controller 200 are shown in more detail at the bottom of FIG. 1. The controller 200 in particular includes a processor 202, a non-volatile memory 204, a data input 206 and a data output 208. The processor 202 retrieves and executes program code stored in the non-volatile memory 204. Input data is received by the processor 202 through input interface and control instructions/commands are transmitted by the processor 202 via data output 208. Whilst it will be appreciated that only one controller is shown in FIG. 1, it will be appreciated that the functions of the controller can be shared by a number of controllers located at appropriate positions within the fuel cell system 10. The controller(s) may also control components within a fuel cell system different from the components shown in FIG. 1 as being controlled.

Figure 2:
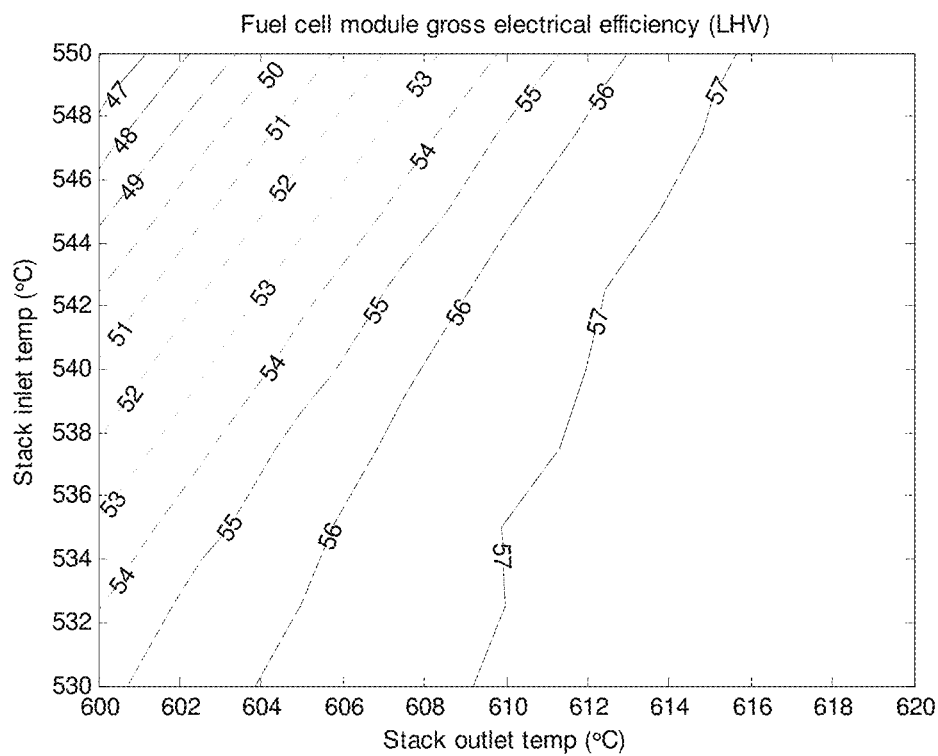
FIG. 2 illustrates the efficiency of an example SOFC system for various inlet and outlet stack temperature based on a 1 kWe IT-SOFC mCHP running on mains natural gas.

FIG. 2 shows modelling results that illustrate the gross electrical efficiency of a SOFC system for various inlet and outlet stack temperature based on a 1 kWe IT-SOFC mCHP running on mains natural gas at or near the beginning of the system's life time.

Optimally the stack inlet temperature is 540 DegC and the stack outlet temperature 610 DegC.

FIG. 2 shows the variation of Fuel Cell Module (FCM) gross electrical efficiency with changes in fuel cell stack inlet and outlet cathode stream temperatures away from the optimum set point for an example electrical power output. A variation in net system efficiency of 5% is possible due to variation in stack temperature set points. Over the lifetime of a fuel cell CHP system, a reduction in net electrical efficiency of 5% would reduce the cost savings by up to £400 for a 700W net output system running for 10 years (3 pence per 1 kWhr gas).

In order to manufacture low cost SOFC systems, conventional mineral insulated base metal thermocouples (Type K or N) are presently the only available cost effective temperature sensor that capable of operating at high temperature. However without mineral insulated metal sheath these thermocouples may fail due to corrosion. These thermocouples are moreover subject to considerable drift at the high temperatures occurring in applications such as those operating SOFC (500-1000° C.).

Figure 3:
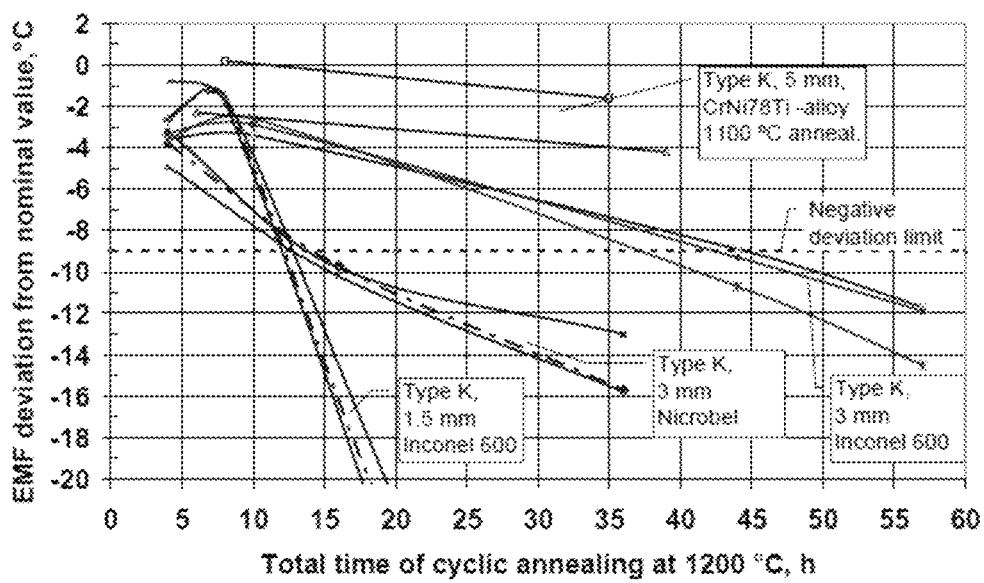
FIG. 3 illustrates deviations from nominal value for type K thermocouples during cyclic annealing at 1200° C.

The diameter of a sheath surrounding the thermocouple and the diameter of the thermocouple wire influence thermocouple drift and can be chosen to minimise drift. A study was carried out by Ulanovskii et al. (Ulanovskii, A. A., Kalimulina, S. I., Belenkii, A. M., Bursin, A. N., Dergausova, L. N., (2012), Determination of the stability of cable thermocouples at the upper limit of their working temperature range, *A/P Conference Proceedings*, 1552, 576) investigating the influence of thermocouple sheath diameter on drift when part of the thermocouple is exposed to cyclic annealing at 1100-1200° C. FIG. 3 reproduced FIG. 3 of Ulanovskii et al. shows results of thermocouples with different sheath diameters (1.5 mm, 3 mm and 5 mm) and sheath material (Inconel 600 and Nicrobel). The graph illustrates that thermocouples with larger diameter drift at a much slower rate than the small diameter thermocouples. It would be apparent, therefore for applications where repeatable temperature measurement is required over a period of time, larger diameter thermocouples are favourable due to their lower drift.

The immersion length of the thermocouple/sheath in the pipe/conduit also affects the balance between the heating mechanisms influencing the measurement made by the thermocouple. Conductive heating experienced at the thermocouple tip is limited (for a given difference between the actual gas temperature and the temperature of the conduit's wall) by the cross-sectional area and immersion length of the sheath. Convective heating in turn, increases with increasing sheath surface area subjected to the gas flow. Conductive heating effects therefore have a smaller effect (when compared to convective heating effects) on temperature measurements taken in an arrangement with a thermocouple/sheath protrudes deeply into the conduit than they have on temperature measurements taken in an arrangement in which the thermocouple/sheath protrudes less deeply into the conduit The thermocouple within the sheath, however, simply measures its own temperature, which is strongly influenced by the temperature of the sheath. The temperature of the sheath, in turn, is not only determined by convective heating by the surrounding gas but in addition also by radiative heating from the structures surrounding the sheath (for example the walls of the conduit) as well as by thermal conduction between the free end of the sheath and the wall of the conduit to which the sheath is connected. In the following the influences of convective, conductive and radiative heating effects have on the temperature measurable at the tip of a sensor (any sensor that has a physical presence within a gas flow, not only thermocouples, will suffer from these influences) are discussed.

Equation 1 shows that larger diameter ($D_{TC}$) thermocouples have lower convection heat transfer coefficient (h) and are therefore less susceptible to heating by convection.

$$h = Nu \frac{k_g}{D_{TC}} \quad (1)$$

where Nu is the Nusselt number, and $k_g$ is gas thermal conductivity.

Whilst increasing thermocouple diameter increases its surface area and therefore increases both its susceptibility to convective as well as radiative heating, the rate of increase in radiative heating caused by an increase in the diameter is higher than for convective heating for a given gas velocity. For instance increasing the thermocouple sheath diameter from 0.2 mm to 2 mm would increase convection by a factor of 4 and radiation by a factor of 14.

Figure 4:
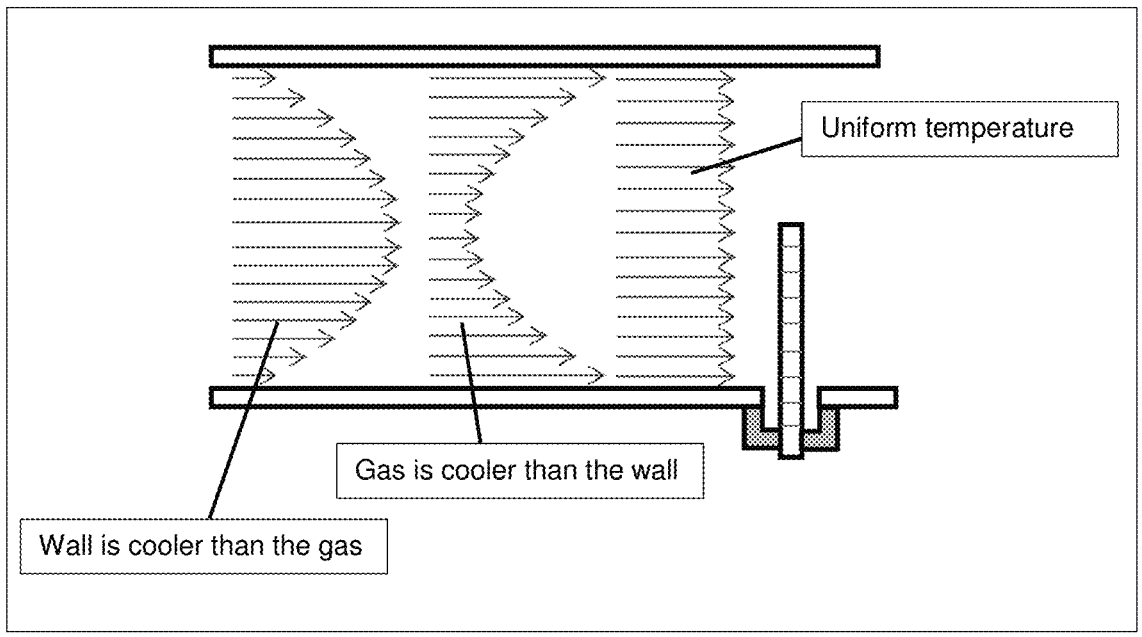
FIG. 4 shows a thermocouple placed inside a pipe and exposed to various gas temperature gradients.

In addition larger thermocouples have larger cross section area and therefore higher heat flow from the wall to the tip. FIG. 4 illustrates this in more detail. As shown there, the thermocouple stem can be subdivided into various sections. Each section of the thermocouple stem is exposed to radiation and convection inside the pipe. For small diameter thermocouples heat flow to the thermocouple via convection and radiation dominates heat flow via conduction from the wall of the conduit (due to small thermocouple cross-section area). As a result, the temperature measured using thermocouples (or any types of sensors) placed in a small diameter sheath is influenced less strongly by conductive heating effects than sensors placed in larger diameter (and/or wall thickness) sheath.

Due to thermal interaction between the adjacent components in solid oxide fuel cells systems such as burner, heat exchangers and reformer a large temperature gradient can exist between the gas and the wall. This can lead to a situation where the thermocouple experiences radiative and/or conductive heating or cooling effects that differ from the convective heating imposed upon the thermocouple by the gas flow in the conduit. As a result, the temperature measured by the thermocouple may overestimate the gas flow temperature (in situations where the conduit walls are hotter than the flowing gas and where, as a consequence, the thermocouple is conductively and radiatively heated to a temperature that is higher than the temperature it would adopt based on the temperature of the flowing gas alone) or underestimate the gas flow temperature (in situations where the conduit walls are cooler than the flowing gas and where, as a consequence, energy is radiated and conducted away from the thermocouple towards the conduit walls).

The temperature of the walls of the conduit could be greater than the gas temperature if the pipe was heated not only by the flowing gas but also by hotter components located adjacent to and outside of the pipe. In this condition thermocouple reading could be higher than the actual gas temperature. Vice versa, if the wall temperature was lower than the gas temperature the thermocouple is likely to underestimate the gas temperature, with thermal energy supplied to the sensor/thermocouple by convective heating radiating and/or being conducted away from the thermocouple to the pipe/conduit walls.

It will be appreciated that, whilst the above problem with measuring temperatures accurately with thermocouples in conduits, or more generally in confined spaces, that have a wall temperature that differs from the temperature of a gas flowing in the conduit has been described above in the context of a fuel cell system, this problem more generally exists in situations in which a thermocouple is used in a conduit or confined space that has a wall temperature that differs from the temperature of a fluid or gas within the conduit or confined space. The solution to this problem presented herein is consequently not limited to fuel cell systems but is applicable to any such other systems as well.

It will moreover be appreciate that, whilst thermocouples are used as an example of sensors that, when place in a position in which they are subject to heating through more than one physical effect, the present invention is not limited to thermocouples. Instead, any sensor having a physical presence within an enclosed space comprising a flowing fluid will be subject to heating or cooling through one or more physical effects, such as conduction, convection and radiation.

Figure 5:
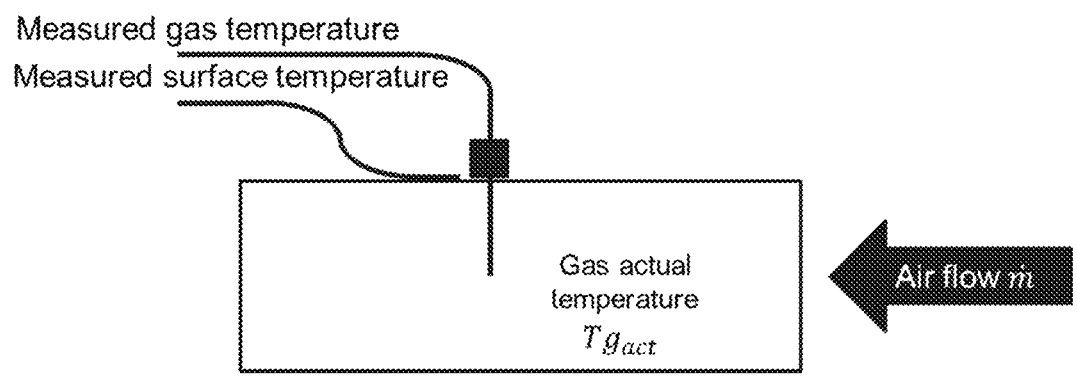
FIG. 5 shows the arrangement of two temperature sensors on/in a conduit.

FIG. 5 illustrates a schematic view of the temperature measurement system according to an embodiment. This system may, for example, form the temperature sensors indicated as T1 and T2 respectively in FIG. 1. In this system in addition to gas temperature measurement sensor ($T_g$) a surface temperature sensor ($T_w$) is used to estimate the radiation and conduction heat to/from the tip. Since pipes are mainly made of high thermal conductivity material such as stainless steel with relatively thin wall (1-2 mm) it is safe to assume that the inner wall temperature is the same as the outer surface. In the following it is assumed that the pipe/conduit wall temperature is uniform around the pipe's/conduit's cross section. These are safe assumptions as a simple thermal analysis shows that due to the high pipe thermal conductivity the temperature difference between the inner wall and outer wall is less than 0.5 DegC. Moreover, for typical fuel cell applications the pipe/conduit diameter is likely to be between 5 mm and 25 mm, with the pipe/conduit being thermally insulated and therefore not subject to significant environmental temperature variances around the diameter or along its length. Therefore, a temperature sensor such as thermocouple can be attached to the exterior surface of the pipe to measure pipe wall temperature.

To calculate the convection heat from the gas to the thermocouple the gas Reynolds number ($Re_D$) is calculated. The Characteristic length for calculating Reynolds number is thermocouple sheath diameter. As the gas mass flow rate is measured to control the fuel cell system's performance and the properties of the gas are known, the Reynolds number can be calculated in a manner that is well known to the person skilled in the art. Hence this calculation is not described in detail in the present disclosure.

In the following a one dimensional mathematical model is provided that quantifies the influences of conduction, convection and radiation on the temperature measurement provided by a thermocouple. Underlying this model is the assumption that the thermocouple is a cylindrical probe immersed in a gas stream inside a pipe. The gas stream is assumed to be a non-viscous fluid and uniform in terms of velocity and temperature across the pipe. The pipe wall was assumed to be at a constant temperature without exhibiting a thermal gradient.

The one dimensional energy balance equation of equation (2) can be used to describe the heat balance for this system. The left term of equation (2) describes the rate of heat flow into the thermocouple. On the right-hand side of the equation are the three terms that transfers heat to/from the thermocpuple.

$$\underbrace{\rho_{TC} C_{TC} \frac{dT_{TC}(x)}{dt}}_{\text{heat accumulation on TC}} = \quad (2)$$

$$\underbrace{k_{TC} \frac{d^2 T_{TC}(x)}{dx^2}}_{\text{Conduction}} + \underbrace{\frac{4}{D_{TC}} h(T_g - T_{TC}(x))}_{\text{Convection}} + \underbrace{\frac{4}{D_{TC}} F\sigma(T_w^4 - T_{TC}^4(x))}_{\text{Radiation}}$$

where $\rho_{TC}$ is the density of the thermocouple, $C_{TC}$ is thermocouple heat capacity, $T_{TC}$ is the temperature measured by the thermocouple, x is the direction along the longitudinal axis of the thermocouple, $k_{TC}$ is the thermal conductivity of the thermocouple, t is time, $D_{TC}$ is the thermocouple diameter, h is the convection heat transfer coefficient, $T_g$ is the temperature of the flowing gas, $T_w$ is the temperature measured by the wall thermocouple, $\sigma$ is the Stefan-Boltzmann constant and F is radiation transfer factor.

It can be seen from the equation 1 above that the Nusselt number (Nu) and gas thermal conductivity ($k_g$) should be calculated in order to estimate h. The Nusselt number Nu is calculated based on a cross flow over a cylinder, as per equation (3). This equation is valid for Reynolds numbers ($Re_D$)≤4000 and Prandtl numbers (Pr) Pr ≥0.2

$$Nu = 0.3 + \frac{0.62 Re_D^{1/2} Pr^{1/2}}{\left[1 + \left(\frac{0.4}{Pr}\right)^{2/3}\right]^{1/4}} \left[1 + \left(\frac{Re_D}{282000}\right)^{5/8}\right]^{4/5} \quad (3)$$

The gas thermal conductivity ($k_g$) can be defined using known gas properties. If the gas is air (such as on the cathode side of the fuel cell) $k_g$ is the thermal conductivity of air. $k_g$ can be calculated by fitting a line to Kadoya and Matsunaga experimental data (Kadoya, K., Matsunaga, N. and Nagashima, A. (1985), Viscosity and thermal conductivity of dry air in the gaseous phase *J. Phys. Chem. Ref. Data*, 14 947-9770). This provides:

$$k_g = T_g \times 6 \times 10^{-5} + 0.0077 \quad (4)$$

Gas viscosity ($\mu$) was calculated with Sutherland's law:

$$\mu = \mu_{ref} \left(\frac{T_g}{T_{ref}}\right)^{3/2} \frac{T_{ref} + S}{T_g + S} \quad (5)$$

where S is Sutherland's constant, $\mu_{ref}$ is a reference viscosity, $T_{ref}$ is a reference temperature. For air $T_{ref}$ is 323 K, $\mu_{ref}$ is $1.716 \times 10^{-5}$ kg m$^{-1}$ s$^{-1}$, with a Sutherland Constant of 120 K.

The radiative heat transfer factor (F) between two bodies can be calculated by equation 6:

$$F = \frac{1}{\frac{1}{\varepsilon_{TC}} + \frac{A_{TC}}{A_w}\left(\frac{1}{\varepsilon_{TC}} - 1\right)} \quad (6)$$

wherein $A_w$ and $A_{TC}$ are the surface areas of the inner surface of the conduit and the outer surface of the thermocouple that are within direct sight of each other. To simplify the equation 6, it was assumed that the thermocouple is a small body enclosed in a larger body (the conduit) with hypothetically homogeneous wall temperature. As a result, the transfer factor (F), can be simplified to the thermocouple emissivity (equation 7):

$$A_w \gg A_{TC} \therefore F \cong \varepsilon_{TC} \quad (7)$$

The thermocouple emissivity does not change within the temperature range the thermocouple is operated in. For the simulation results provided below it was assumed that emissivity for an Inconel thermocouple at temperature below 700° C. is around 0.6. However, a considerable body of information is available on this matter, so that emissivity values can be chosen appropriately, if desired.

The exact solution for a steady state version of equation 2 has been published by Asadi et al (Asadi M and Haghighi Khoshkho R 2013 Temperature Distribution along a Constant Cross Sectional Area Fin International Journal of Mechanics and Applications 3 131-137). However, this solution is not suitable for adequately describing dynamic systems, such as solid oxide fuel cell systems, given that, for example, pipes temperature vary at different electrical loads. It would, in particular, be important to know the transient time of the system to accurately control it. However, for transient conditions it is considerably more difficult to generate analytical solution of equation (2). For this reason some embodiments rely on numerically solving equation (2). One way of solving equation (2) numerically has been disclosed by Barari et al (F Barari, R Morgan and P Barnard, A Design of Experiments (DOE) approach to optimise temperature measurement accuracy in Solid Oxide Fuel Cell (SOFC), 32$^{nd}$ UIT (Italian Union of Thermo-fluid-dynamics) Heat Transfer Conference, Journal of Physics: Conference Series 547 (2014)).

Figure 6:
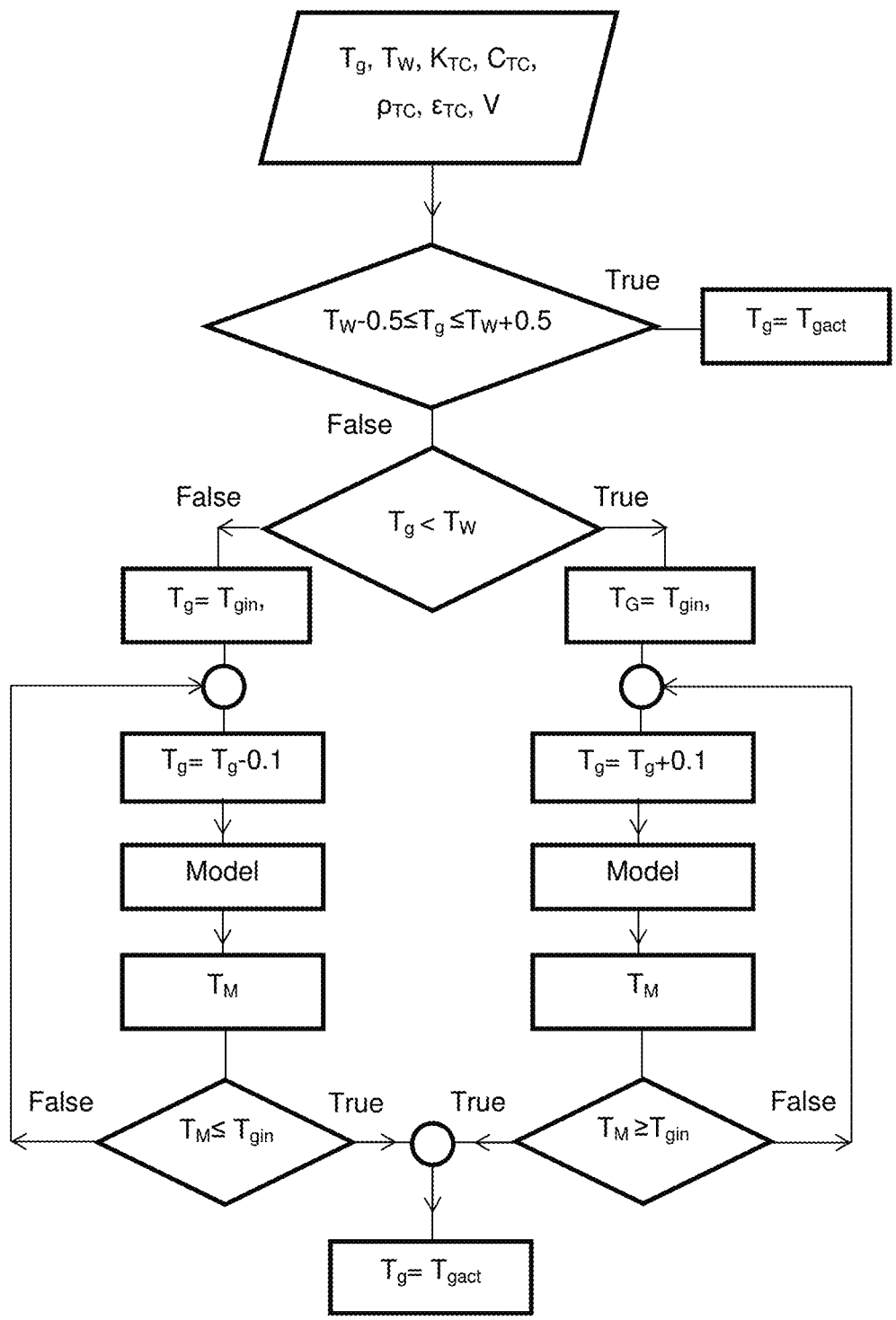
FIG. 6 shows a flow chart of a method according to an embodiment.

FIG. 6 illustrates a method of determining the temperature of the flowing gas based on a temperature measured by the thermocouple in the conduit and a wall temperature measured by the thermocouple mounted on the wall of the conduit. Wherein $T_g$ is the gas temperature measured by the thermocouple (this value is later used as a variable value, wherein the originally measured value is stored in variable $T_{gin}$) $T_M$ is the thermocouple temperature predicted by the model of equation (2) based on an assumed gas temperature $T_g$ input to the model, $T_w$ is the measured wall temperature, $K_{TC}$ is the thermocouple thermal conductivity, $C_{TC}$ is the thermocouple heat capacity, $\rho_{TC}$ is the thermocouple density, $\varepsilon_{TC}$ is the thermocouple emissivity, v is the gas velocity inside the pipe, $TC_L$ is the length of the thermocouple within the pipe (including any protective sheath) and $TC_D$ is the diameter of the thermocouple (including any protective sheath).

It will be appreciated that $K_{TC}$, $C_{TC}$, $\rho_{TC}$, $\varepsilon_{TC}$, $TC_L$ and $TC_D$ are known for a given system/thermocouple setup. $T_g$ and $T_w$ are measured by the two thermocouples arranged on/in the pipe in the manner shown in FIG. 5. v is measured separately.

In a first step, the wall temperature $T_w$ is compared to the measured gas temperature $T_g$. If the gas temperature is within an acceptable value, for example 0.5 DegC of the wall temperature ($T_w - 0.5 \leq T_g \leq T_w + 0.5$), then any of the above described radiative or conductive heating or cooling effects caused by a discrepancy between the wall temperature and the temperature measured at the thermocouple tip is deemed negligible or at least acceptable. In this case the method proceeds to provide, as the output gas temperature $T_{gact}$ the measured gas temperature $T_g$, $T_g = T_{gact}$. The choice for an acceptable value depends on the criticality of the temperature measurement and the temperature measurement capability of the measurement system used. It will be appreciated that whilst in the embodiment a margin of ±0.5 DegC is used when determining whether or not the gas temperature is substantially equal to the gas temperature, other temperature margins can equally well be chosen. The choice of margin mainly depends on the desired or required measurement accuracy.

Should it be determined that the measured gas temperature $T_g$ is not substantially equal to the wall temperature $T_w$, then a determination is made if the wall temperature $T_w$ is larger than the measured gas temperature $T_g$, $T_w>T_g$. Should this not be the case, i.e. if $T_w<T_g$, the method proceeds to the left-hand branch shown in FIG. 6.

It will be appreciated that, for either of $T_w>T_g$ and $T_w<T_g$ the measured gas temperature $T_g$ is unlikely to accurately reflect the temperature of the gas, as the temperature measured by the thermocouple is influenced by thermal radiation and conduction in the manner described above. It is moreover known that, if the wall temperature $T_w$ is larger than the measured gas temperature $T_g$ (right-hand branch of the FIG. 6 flow-chart), the thermocouple will experience conductive and/or radiative heating, so that the measured gas temperature $T_g$ overestimates the actual gas temperature $T_{gact}$. Conversely, if the wall temperature $T_w$ is lower than the measured gas temperature $T_g$ (left-hand branch of the FIG. 6 flow-chart), the thermocouple will experience conductive and/or radiative cooling (at least relative to the temperature that would be established by convective heating alone), so that the measured gas temperature $T_g$ underestimates the actual gas temperature $T_{gact}$.

Both branches of the method illustrated in the flow chart shown in FIG. 6 set out to use a given gas temperature $T_g$ as an input to the mathematical model described above by equation (2) to calculate the thermocouple temperature $T_{TC}$ on the left-hand side of equation (2). The flow chart of FIG. 6 refers to the calculated temperature as the temperature $T_M$ (of the thermocouple immersed in the fluid flow) that has been calculated using the model. As for $T_g<T_w$ it is known that the measured temperature $T_g$ overestimates the gas temperature $T_{gact}$, the temperature $T_g$ that is used as an input for the mathematical model in the left-hand branch of the flow chart of FIG. 6 is reduced by a predetermined amount (0.1 DegC in the example discussed with reference to FIG. 6). The thus reduced input temperature $T_g$ is then fed into the model provided by equation (2) and the thermocouple temperature $T_M$ that the model would expect to be measured for this input temperature $T_g$ (an all of the other parameters, including the measured $T_w$) of this reduced gas temperature is calculated using the model.

As it is known that the originally measured thermocouple temperature overestimates the temperature of the gas for $T_g>T_w$ the temperature $T_M$ calculated on the basis of $T_g$ will be larger than the measured gas temperature (originally stored in variable $T_g$ but the originally measured value also stored in the first step in the left-hand side of method of FIG. 6 in variable $T_{gin}$) until such overestimating is removed by successive reduction in $T_g$. Thus, if the calculated temperature $T_M$ falls below or equals $T_{gin}$ it is concluded that the gas temperature $T_g$ used in the iterative cycle that has resulted, for the first time, in the condition of $T_M$ falling below or equalling $T_{gin}$, no longer overestimates the actual temperature of the flowing gas. In this situation the iterative cycle of the left-hand side of the method illustrated in FIG. 6 is interrupted and the current gas temperature $T_g$ is output as the actual gas temperature $T_{gact}$.

Should this condition ($T_M \leq T_{gin}$) not yet be fulfilled, then the left-hand branch of the FIG. 6 method proceeds to reduce the input temperature $T_g$ for use in the model by another step size (0.1 DegC in this example) and calculate the thermocouple temperature $T_M$ using the new temperature $T_g$ as input.

Conversely, for $T_g<T_w$ it is known that the measured temperature $T_g$ underestimates the actual gas temperature. The method therefore increases the temperature $T_g$ that is used as an input for the mathematical model by a predetermined amount (0.1 DegC in the example discussed with reference to the right-hand branch of FIG. 6). The increased temperature is then input into the model and the thermocouple temperature $T_M$ that the model would expect for this increased gas temperature is calculated using the model.

As it is known that the originally measured thermocouple temperature underestimates the temperature of the gas for $T_g<T_w$ the temperature $T_M$ calculated on the basis of $T_g$ will be smaller than the measured gas temperature (again originally stored in variable $T_g$ but the originally measured value also stored in the first step in the right-hand side of method of FIG. 6 in variable $T_{gin}$) until such underestimating is removed by successive increases in $T_g$. Thus, if the calculated temperature $T_M$ exceeds or equals $T_{gin}$ it is concluded that the gas temperature $T_g$ used in the iterative cycle that has resulted, for the first time, in the condition of $T_M$ exceeding or equalling $T_{gin}$, no longer underestimates the actual temperature of the flowing gas. In this situation the iterative cycle of the right-hand side of the method illustrated in FIG. 6 is interrupted and the current gas temperature $T_g$ is output as the actual gas temperature $T_{gact}$.

Whilst in the embodiment discussed with reference to FIG. 6 one criterion for interrupting the iterative cycles shown in the left- and right-hand paths of FIG. 6 is that the calculated temperature $T_M$ either corresponds with or falls below the temperature $T_{gin}$ (left-hand path of FIG. 6) or corresponds with or falls above the temperature $T_{gin}$ (right-hand path of FIG. 6) it will be appreciated that the iterations can also be terminated if the temperature $T_M$, whilst still being somewhat higher than $T_{gin}$ if, before iteration $T_g>T_w$ or still being somewhat lower than $T_{gin}$ if, before iteration $T_g<T_w$. In one embodiment the iterations are, for example, interrupted if the calculated temperature $T_M$ is within a predetermined range of $T_{gin}$, say within a range of $T_{gin}$ and $T_{gin}+0.5$ DegC for the left-hand path of FIG. 6 and within a range of $T_{gin}-0.5$ DegC and $T_{gin}$ for the right-hand path of FIG. 6. The magnitude of the predetermined range may be chosen based on the accuracy requirements of the control application for which the measured temperature value is to be used. Whilst the 0.5 DegC used in the present example may provide suitable accuracy for the temperature determination in one embodiment a higher accuracy maybe required in another application. In the latter case a smaller predetermined range, for example 0.1 DegC or 0.25 DegC may be used in another embodiment. Conversely, larger predetermined ranges, for example 1 DegC, may be chosen if the accuracy requirements of an application in question permit. In doing so fewer iterations may be required to reach the interrupt criterion, reducing the amount of time required for determining the gas temperature.

It will be appreciated that the accuracy of the gas temperature $T_g$ depends, amongst other things, on the amount by which the temperature $T_{gact}$ has been reduced by a cooler wall temperature or increased by a hotter wall temperature, which can be catered for in the left-/right-hand branches of the FIG. 6 method. Conversely, the number of iterative steps required before the interrupt condition $T_g<T_w$ or $T_g>T_w$ is reached increases with decreasing amount of change to the temperature $T_g$ in each iteration. It is consequently possible to balance convergence speed of the method with achievable accuracy by choosing a larger step size for quicker convergence or a small step size for accuracy. In one embodiment the step size (temperature amount subtracted/added in the left-/right-hand branch of the method shown in FIG. 6) may initially be chosen to be large (for example one or several DegC) to achieve quick initial convergence and later be reduced to a smaller amount (for example a fraction of a DegC) so that the predicted temperature $T_{gact}$ is as accurate as possible (or, put in other words, so that the interrupt condition is as close as possible to $T_M=T_{gin}$). Any such reduction in step size can either be such that only two step sizes, an initial step size and a later step size, wherein the initial step size is larger than the later step size, are used. Conversely, a reduction may be gradual and may, for example, be based on the change in $T_M$ achieved by a previous reduction in the input temperature $T_g$.

As discussed above, the method described above is particularly advantageous in a dynamic system in which measured values can change relatively rapidly. It will be appreciated that, if the time required for completing the above described iterations is such that the temperature of the gas surrounding the thermocouple or the wall temperature has changed by the time the interrupt condition is satisfied, the benefits derivable from the method are diminished when compared to a more rapidly converging method, as the temperature determined by the method is used as an input for controlling associated apparatus, a fuel cell system in the example discussed here. The speed at which the interrupt condition can be satisfied does of course not only depend on the number of iterations performed by the method but also on the computational resources available for performing the required processing. In one embodiment therefore a second or alternative interrupt condition is provided, so that the method stops iterating once a predetermined amount of time has passed or after a predetermined number of iterations. This interrupt condition is, in one embodiment, used in combination with the interrupt condition(s) shown in FIG. 6.

Figure 7:
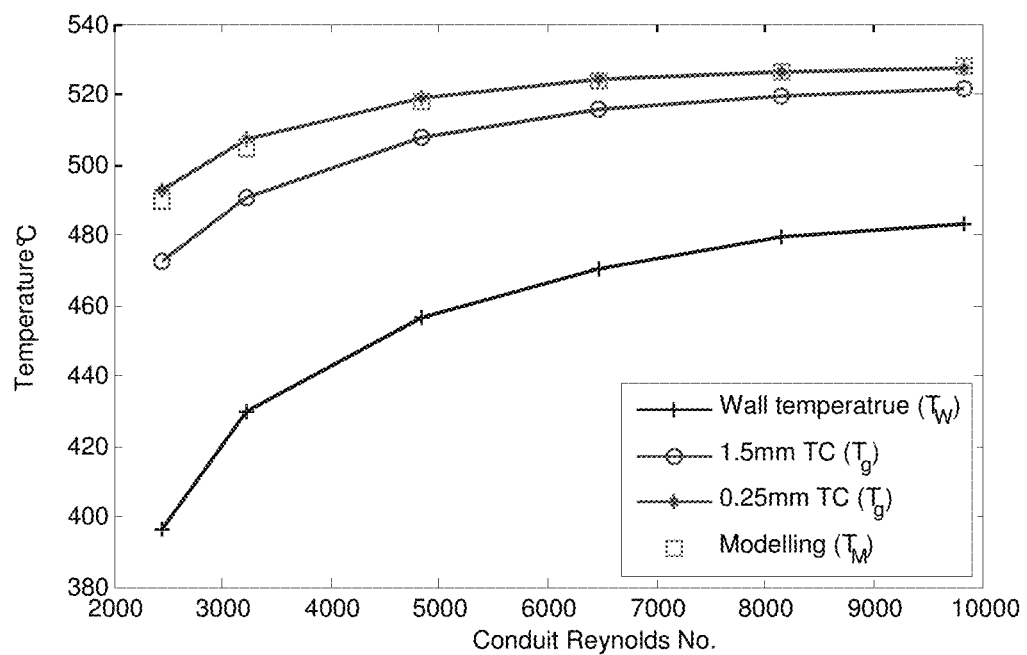
FIG. 7 shows a comparison between temperature values measured using different diameter thermocouples and temperature values corrected in accordance with an embodiment where the wall temperature are less than the temperature of a flowing gas.

FIG. 7 shows the conduit wall temperature and gas temperature measured using a 0.25 mm and 1.5 mm diameter thermocouples at the locations indicated in FIG. 5. FIG. 7 shows that the wall temperature is lower than the gas temperature ($T_g > T_w$). As a consequence the 0.25 mm diameter thermocouple provides a higher temperature reading than the 1.5 mm thermocouple. As discussed earlier, temperature measurements made using a small diameter thermocouple is less affected by the wall conduit temperature and therefore reads more accurately than a larger thermocouple at the centre of the conduit. The wall conduit and gas temperature were used to calculate the actual gas temperature at the centre of the conduit. FIG. 7 shows good agreement between the gas temperature values calculated using the measurements acquired with the 1.5 mm diameter thermocouple as a starting point and the temperature readings acquired using the 0.25 mm diameter thermocouple.

Figure 8:
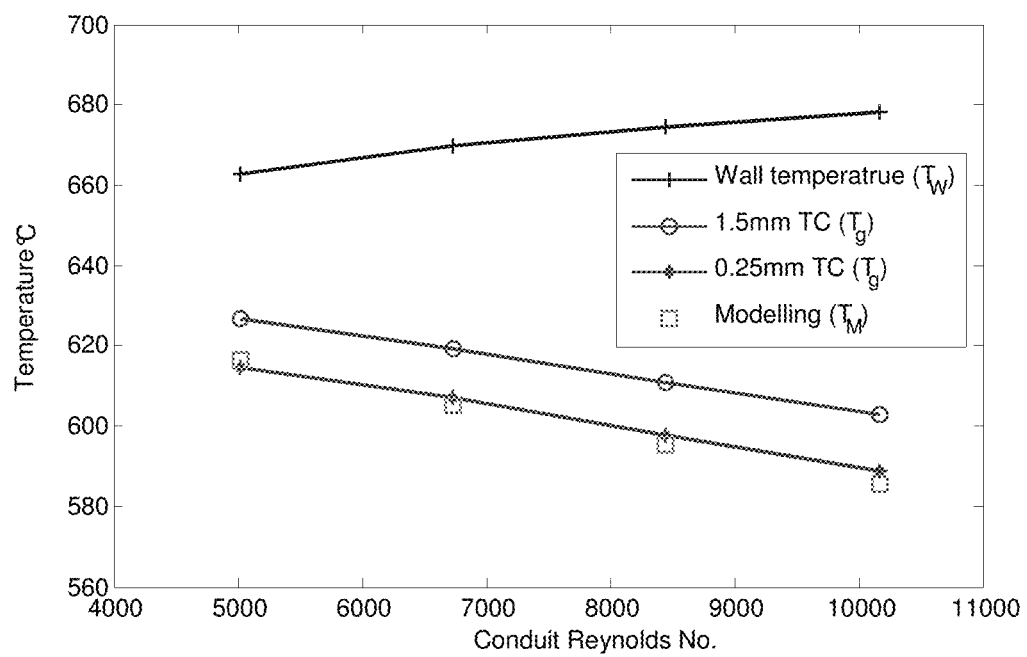
FIG. 8 shows a comparison between temperature values measured using different diameter thermocouples and temperature values corrected in accordance with an embodiment where the wall temperature are greater than the temperature of a flowing gas.

FIG. 8 shows the measured gas temperature at the centre of the conduit when the conduit wall temperature is higher than the gas temperature ($T_g < T_w$). Since the conduit wall radiates heat to the thermocouple the 1.5 mm thermocouple reads higher than the 0.25 mm thermocouple. The results show a good agreement between the temperature values calculated using the temperature values acquired with the 1.5 mm diameter thermocouple as a starting point and the experimental data acquired with the 0.25 mm diameter thermocouple.

The present invention is not limited to the above embodiments only, and other embodiments will be readily apparent to one of ordinary skill in the art without departing from the scope of the appended claims.

REFERENCE SIGNS 10-fuel cell system
20-fuel cell stack
30-fuel cell
40-anode side
41-fuel cell stack anode inlet
41A-fuel cell anode inlet
42-fuel cell stack anode off-gas outlet
42A-fuel cell anode outlet
50-electrolyte layer
60-cathode side
61-fuel cell stack cathode inlet
61A-fuel cell cathode inlet
62-fuel cell stack cathode off-gas outlet
62A-fuel cell cathode outlet
70-steam reformer
71-reformer inlet
72-reformer outlet
80-tail-gas burner
81-tail-gas burner exhaust
82-anode off-gas inlet
83-cathode off-gas inlet
90-fuel source
100-evaporator
101-fuel inlet
102-water inlet
103-water supply
104-evaporator exhaust
110-anode off-gas heat exchanger
120-condenser heat exchanger
121-cooling circuit
130-separator
131-separator condensate outlet
140-oxidant inlet
140'-oxidant inlet
150-air pre-heater heat exchanger
160-reformer heat exchanger
161-reformer heat exchanger oxidant inlet
162-reformer heat exchanger oxidant outlet
170-evaporator heat exchanger
180-fuel cell system exhaust
190-air bypass inlet
200-control means
202-processor
204-non-volatile memory
206-data input
208-data output
210-blower
220-valve/separator
230-main cathode inlet gas flow path
240-air bypass inlet gas flow path
250-fuel source
A-anode inlet gas fluid flow path
B-anode off-gas fluid flow path
C-cathode inlet gas fluid flow path
D-cathode off-gas fluid flow path
E-tail-gas burner off-gas fluid flow path
L-electrical load
T1-fuel cell stack cathode inlet gas temperature sensor
T2-fuel cell stack cathode off-gas temperature sensor

The invention claimed is:

1. A fuel cell system comprising:
a controller;
a temperature sensor that has a physical presence in a conduit within the system; and
a wall temperature sensor for sensing a temperature of a wall of the conduit;
the controller operative to iteratively apply a thermal model to calculate a predicted temperature value that is, based on temperature values measured using the temperature sensor in the conduit and the wall temperature sensor, expected to be measured;

wherein, when in an iterative step the predicted temperature value does not fulfil an interrupt criterion, an input temperature value used in a next iterative step is altered based on a difference between the temperatures measured by the sensors.

2. A fuel cell system as claimed in claim 1, wherein in a first iteration step the input temperature is the temperature measured using the sensor in the conduit.

3. A fuel cell system as claimed in claim 1, wherein the controller is arranged to reduce the input temperature value for use in the next iterative step if the temperature value measured using the temperature sensor in the conduit is larger than the temperature value measured by the wall sensor and/or increase the input temperature value for use in the next iterative step if the temperature value measured using the temperature sensor in the conduit is smaller than the temperature value measured by the wall sensor.

4. A fuel cell system as claimed in claim 1, wherein a first alteration of the input temperature value is larger than a second alteration, wherein the first alteration is undertaken in an earlier iterative step than the second alteration.

5. A fuel cell system as claimed in claim 1, wherein said interrupt criterion is fulfilled:
when the predicted temperature value falls within a predetermined temperature range of or below the temperature value measured using the sensor in the conduit in cases where the temperature value measured using the temperature sensor in the conduit is larger than the temperature value measured by the wall sensor; and/or
when the predicted temperature value falls within a predetermined temperature range of or above the temperature value measured using the sensor in the conduit in cases where the temperature value measured using the temperature sensor in the conduit is smaller than the temperature value measured by the wall sensor.

6. A fuel cell system as claimed in claim 1, wherein said interrupt criterion is fulfilled when a predetermined number of iterative steps has been performed and/or when a predetermined time permitted for the calculation has elapsed.

7. A fuel cell system as claimed in claim 1, wherein a temperature value input in a final iterative step performed is output as a corrected temperature of a gas flowing in the conduit.

8. A fuel cell system as claimed in claim 7, further configured to use the corrected temperature for altering an operating parameter of the fuel cell system.

9. A fuel cell system as claimed in claim 8, wherein the operating parameter controlled is the temperature and/or the mass flow rate of the gas inlet to an anode and/or cathode of a fuel cell.

10. A fuel cell system as claimed in claim 1, wherein one or both temperature sensors are thermocouples.

* * * * *